US006505500B1

(12) United States Patent
Elgh et al.

(10) Patent No.: US 6,505,500 B1
(45) Date of Patent: Jan. 14, 2003

(54) ARRANGEMENT FOR DETECTING IONIZATION IN THE COMBUSTION CHAMBER OF A DIESEL MOTOR, INCLUDING ASSOCIATED MEASUREMENT AND CALIBRATION DEVICES

(75) Inventors: Bengt Elgh, Åmål (SE); Michael Georghiou, Åmål (SE); Christian Carlsson, Åmål (SE); Thomas Meldert, Åmål (SE); Magnus Glavmo, Luxembourg (SE)

(73) Assignee: Mecel AB, Åmål (SE)

( * ) Notice: Subject to any disclaimer, the term of this patent is extended or adjusted under 35 U.S.C. 154(b) by 0 days.

(21) Appl. No.: 09/532,409

(22) Filed: Mar. 22, 2000

(51) Int. Cl.[7] ............................ G01L 23/22; G01L 3/26
(52) U.S. Cl. ...................................... 73/35.08; 73/117.3
(58) Field of Search ................................ 73/35.08, 116, 73/117.3; 123/425, 435

(56) References Cited

U.S. PATENT DOCUMENTS 4,947,680 A * 8/1990 McDougal .................. 73/116
5,103,789 A * 4/1992 Hartman et al. ............. 73/116

* cited by examiner

*Primary Examiner*—Eric S. McCall
*Assistant Examiner*—Maurice Stevens
(74) *Attorney, Agent, or Firm*—Jeffrey Pearce

(57) ABSTRACT

The invention provides an arrangement for detecting ionization in the combustion chamber of a combustion motor where the fuel self-ignites by means of compression, as well as associated measurement device and calibration devices. A measurement tip extends substantially down into a main combustion chamber, which provides access to the portion of the combustion chamber where combustion first starts. The measurement device has a simple construction with good thermal conductivity. Using the calibration device according to the invention, the performance of the measurement device can be optimized from the point of view of control in different combustion motors in which the characteristic ion stream signal for each type of motor can be correlated against pressure data from combustion and used to calibrate the motor. The arrangement, the measurement device, and the calibration device allow implementation of ion-stream measurement in combustion motors of the diesel type, in which the start of combustion, as well as very small amounts of injected fuel, may be detected without lag and with high accuracy.

8 Claims, 6 Drawing Sheets

ARRANGEMENT FOR DETECTING IONIZATION IN THE COMBUSTION CHAMBER OF A DIESEL MOTOR, INCLUDING ASSOCIATED MEASUREMENT AND CALIBRATION DEVICES

BACKGROUND OF THE INVENTION

1. Field of the Invention

This invention relates to an arrangement for detecting ionization in the combustion chamber of a diesel motor, as well as a measurement device and a calibration device for such an arrangement.

2. Description of the Related Art

There are several known solutions for detecting ionization in diesel motors. In Swedish Patent SE,A,9400603 is shown a solution in which a tube-shaped probe is arranged concentrically around the injection nozzle. Using this tube-shaped probe, it is not possible to access the outer region in the injected fuel plume where the combustion starts and the ionization first occurs. The ideal fuel-air relationship for initiating combustion is found in the border zone between the injected fuel plume and the air mass in the combustion chamber.

In U.S. Pat. No. 4,377,140 as well as published European Patent Application EP,B,190,206 are shown variations in which a probe is included for detecting ionization in the pre-chamber of a diesel motor. Even if the combustion takes place in the pre-chamber, the ionization signal gives worse information about the combustion in the main combustion chamber. In motors with a pre-chamber, a lower efficiency is achieved, and in certain types of motors with a pre-chamber, dual injectors are implemented, one for the main combustion chamber, and one for the pre-chamber.

European Patent EP,B,71,557 shows a variation in which an ion-stream probe sits recessed in the wall of the combustion chamber, and in which a cavity is created in the wall behind a narrow measurement slit around the ion-stream probe. In this case, the fast rate of flow of the combustion gases through the measurement slit into the cavity helps keep the measurement slit free from carbon deposits. This leads to an unfavorable combustion chamber, not only because of the increase of heat loss through the walls of the combustion chamber due to the cavity, but also because a disadvantageous combustion zone is formed in the cavity, which increases the exhaust of incompletely combusted particles. In an alternative embodiment in EP,B,71,557 there is a simple measurement probe in the form of a screw whose end portion lies exposed to the combustion chamber at the level of the roof of the cylinder.

U.S. Pat. No. 5,347,856 shows a solution for use in Otto motors, where measurement of the ionization in the combustion chamber takes place in the spark plug gap. In this text, it is asserted that the size of the central electrode of the spark plug, which is subjected to an electrical voltage, has significance for the amplitude of the measurement signal obtained. It is stated that, by increasing the size of the central electrode, the amplitude of the output signal increases, provided that the applied measurement voltage is kept constant. The explanation for this is that the measurement probe, over which a voltage is applied, is exposed more to the combustion gases and is thus surrounded by more ionized particles, which then increase the signal strength. In this prior art device, a measurement voltage is applied to the central electrode, and the measurement stream that is formed runs essentially between the central electrode and the side electrode, in the periphery of the combustion chamber.

The object of this invention is to correctly detect the beginning of combustion in diesel motors that have direct injection into the main combustion chamber, with minimal lag in the detection. The motor can then be better controlled with respect to the most important parameter, namely, the beginning of combustion.

Another object of the invention is to be able to correctly detect the beginning of combustion even in the cases of so-called pilot-injection, in which only small amounts of fuel are injected into the combustion chamber. Pilot-injection is used both to limit the powerful sound of combustion that is caused by the strong rise in pressure in the combustion chamber and to reduce the combustion temperature and thus even reduce he amount $NO_x$ that is formed. The amounts that occur in pilot-injection are on the order of a few percent up to around 20 percent of the total required fuel quantity; there are therefore high demands on the accuracy of the detection.

Yet another object of the invention is to allow wide tolerances in the amount of injected fuel from the diesel injectors, whereby a larger separation between the individual injectors can be accepted. With a more accurate control of the injected fuel amount during pilot-injection, each injector can be controlled individually using feedback information from the combustion. Simpler and less expensive injectors can then be used.

SUMMARY OF THE INVENTION

The invention provides an arrangement for detecting ionization in an open-chamber combustion chamber of a combustion motor in which the fuel self-ignites by means of compression. A recess is provided in an upper surface of a piston that moves in the cylinder. Fuel for self-ignition and combustion is injected into the recess. A measurement device has a measurement tip that detects ionization in the combustion chamber. The measurement tip extends into the combustion chamber through a roof of the cylinder and down into the recess of the piston and terminates substantially centrally within the combustion chamber.

In the preferred embodiment, the distance between an innermost end of the measurement tip and the cylinder roof, when the piston is in an upper dead-point position within the cylinder, lies in the interval 20–60% of the distance between the cylinder roof and the upper surface of the piston, and preferably exceeds 40% of this distance.

The recess is substantially annular and rotationally symmetric about a central axis of the piston, with a centrally located protrusion extending upward from an upper surface of the piston. The measurement tip extends into the combustion chamber and down into the recess of the piston so that the distance between an innermost portion of the tip and the centrally located protrusion, when the piston is in an upper dead-point position, is less than the distance between the innermost portion of the measurement tip and remaining surfaces on the upper surface of the piston.

The arrangement preferably also includes an injector that injects fuel directly into and essentially centrally in the combustion chamber and down into the annular recessed piston. The injector has a plurality of outlets directing fuel plumes substantially radially outward from the injector and substantially perpendicular to the cylinder walls. The measurement tip is thereby preferably arranged in the combustion chamber tangentially to the fuel plumes.

The measurement device is preferably substantially rod-shaped and comprises: a) an inner end portion exposed within the combustion chamber, and an outer end portion forming a connection to external measurement equipment; b) an electrically conductive, lengthwise extending member formed as a single piece and a central portion with a diameter greater than diameters of both the inner and outer end portions of the measurement device; c) a longitudinally extending, cylindrical housing having an inner end and a lengthwise extending bore in which the electrically conductive member is located, and a radially inward extending shoulder on the inner end of the housing; d) a cap piece arranged in an outer end of the housing; e) a first insulating bushing arranged in the inner end of the housing between the radially inward extending shoulder on the inner end of the housing and the of the electrically conductive member; f) a second insulating bushing arranged around the outer end portion of the housing between the cap piece and the central portion of the electrically conductive member; and g) an insulating slit located between an inner surface of the housing and the electrically conductive, lengthwise extending member, and which may be filled with an electrically insulating material having high thermal conductivity. The first insulating bushing is preferably arranged concentrically around the electrically conductive member and is provided with a collar that extends in the longitudinal direction towards the measurement tip farther than an innermost portion of the housing.

The invention also provides a calibration device that may be used in conjunction with a compression-ignition motor of the type described above. The calibration device includes: a) a longitudinally extending housing having an inner end portion and an outer end portion; b) an electrically conductive member extending lengthwise within the housing; c) a sheath extending around the electrically conductive member and insulating it from the housing; and d) a pressure sensor having a connecting channel in the housing, a first end of the connecting channel opening into a combustion chamber of the motor and a second end of the connecting channel exposing a sensor element of the pressure sensor to combustion gases in the combustion chamber via the connecting channel.

The pressure sensor is integrated into the calibration device for detecting ionization. The calibration device can be used to calibrate the ion-stream information relative to pressure data for diesel motors. In these diesel motors, detection of ionization is used with an arrangement according to the invention, as well as a measurement device for feedback control of, among other things, the time of injection, the injected fuel quantity, and the balance between the cylinders.

Using the arrangement according to the invention and the associated measurement and calibration devices, an implementation for ionization detection in the combustion chamber of diesel motors is made possible with a very high signal-to-noise ratio. Ionization is detected in direct connection with the combustion zone, so that the starting time of the combustion can thus be detected more exactly; moreover, even small injected quantities of fuel, which result in weak combustion of short duration, can be detected with high accuracy.

BRIEF DESCRIPTION OF THE DRAWINGS

FIG. **6*a* shows a second embodiment of the calibration device according to the invention.

DETAILED DESCRIPTION

The general arrangement of the preferred embodiment invention is first described. This is followed by a description of the preferred embodiment of a measurement probe, and a description of a preferred calibration device, both of which are included in the preferred general arrangement of the invention.

General Arrangement of the Invention

Figure 1:
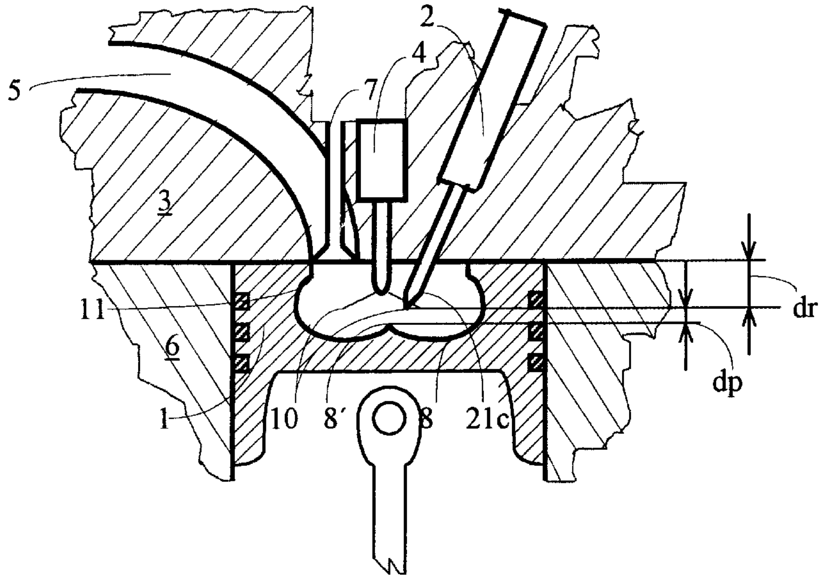
FIG. 1 is a cross-sectional view of a combustion chamber having the measurement arrangement according to the invention arranged to detect ionization centrally in the combustion chamber.

FIG. 1 shows the general arrangement according to the invention for detecting ionization in the combustion chamber of an internal combustion motor in which ignition of injected fuel takes place through self-ignition. The combustion motor is preferably, but not exclusively, a diesel motor, and different types of fuel may occur. As is conventional, the combustion chamber is limited by a cylinder head 3, a cylinder block 6, and a piston 1 that moves within the cylinder. Intake and exhaust valves are arranged in the cylinder head (only one intake valve 7 is shown in FIG. 1), which provide the combustion chamber with air and allow evacuation of residual combustion gases, respectively. In the illustrated, exemplifying embodiment, the piston is provided with a recess 8, which is preferably rotationally symmetric about an axis that runs vertically and centrally relative to the cylinder bore. This recess forms a guide for the air that is pulled into the combustion chamber, which is given a rotation (often referred to as "swirl") in order to achieve a better mixture of the injected fuel and the intake air. The recess 8 is provided with a centrally arranged raised portion 8', so that an annular recess is created for optimum guiding of the air rotation.

This type of combustion chamber is typically referred to as an "open chamber," which means that there is no prechamber. An intake channel 5 is preferably also curved around a vertical axis in the cylinder head 3 to guide the intake air down into the recess 8 so that rotation takes place.

In order to inject fuel, an injector 4 is arranged in the cylinder head 3. The injector extends centrally down into the combustion chamber and, via a plurality of jets aimed essentially radially, it deposits the fuel into the annual recess 8 in the piston 1. In FIG. 1, two jets are indicated (jet 10 and the jet extending from the opposite side of the injector tip). It is, however, common to have between five and eight fuel jets evenly distributed around the circumference of the injector. More jets means that one can achieve a finer distribution of the fuel, which, together with the high injection pressure and the high rotational speed, that is, swirl, of the air, contributes to reducing the emissions of primarily particles, which consist mostly of carbon particles from fuel that is not completely combusted.

Much effort has been applied to the problem of optimizing combustion engines so that the rotation of the air mass formed in the combustion chamber will be adapted to the injected fuel plume; the goal is that the combustion cavity in the piston should be completely filled with an ideal fuel-air mixture, Introducing components that disturb the air rotation has, however, in general been considered to oppose the optimization conditions that apply to the air rotation in combustion motors, so that such suggested solutions have typically been rejected.

If the ionization upon combustion of the injected fuel is to be detected, in order to detect the start of combustion (SOC) and even the end of combustion (EOC), then it is very important that the detection should take place when the injected quantity of fuel is first ignited, and also when the last injected amount of fuel has completed combustion. By measuring the ionization in a pre-chamber, detection can be carried out with no significant lag when the fuel-air mixture in the pre-chamber is ignited. If the detection is done in the connecting channel (also known as the "shot channel"), then there is good detection of when the developed flame shoots down into the main combustion chamber, but worse detection of when the combustion in the main combustion chamber begins or ends.

In applications where an ion-stream probe is mounted in a channel or in the pre-chamber, a type of low-pass filtering arises. This low-pass filtering can lead to a failure to detect very short-lived combustion, for example from pilot injection.

According to the invention, a tip 21*c* of a measurement probe 2 for detecting the ionization is therefore preferably arranged so that it lies in direct connection with the fuel plumes that are formed in the combustion chamber from the fuel jets that are sprayed out from the outlet holes of the injector.

In order to achieve such a placement, the measurement tip 21*c* in the combustion chamber of the open-chamber type is arranged centrally in the recess 8 provided in the piston, preferably so that the measurement tip 21*c* extends down into the combustion chamber from the roof of the cylinder and down into the recess 8 of the piston 1. The distance dr between the end of the measurement tip 21*c* and the cylinder roof, when the piston is in its upper dead-point position, preferably extends approximately 40 percent of the distance between the cylinder roof and the piston (dp+dr). This locates the tip 21*c* of the measurement probe 2 essentially centrally in the combustion chamber. A well-exposed measurement tip for detecting ionization is necessary not only for correctly detecting the start of combustion without lags, but also for detecting combustion of very short duration, such as with pilot injection of very small amounts of fuel.

It is necessary to ensure that there will always be sufficient clearance between the measurement tip 21*c* and uppermost part of the piston 1, that is, to prevent the piston from hitting the tip. Let dp be the distance dp between the innermost point of the end of the measurement tip 21*c* and the axially uppermost extending portion of the piston in the recess 8 when the piston is in the upper dead-point position. The tip 21*c* should then be positioned, by suitably drilling or otherwise making the hole in which the probe 2 is mounted in the cylinder head 3, so that dp lies within the interval of 20–60% of the distance between the cylinder roof and the upper surface of the piston. The measurement tip 21*c* can be arranged to lie to the side of the raised portion 8', that is, so that the measurement tip 21*c* is displaced radially from the raised portion 8', thereby forming the needed radial clearance. In some applications, the upper part of the cylindrical outer surface of the measurement tip can also lie near the inner part of the compression (often referred to as "squish") surface on the outer edges of the piston. In conjunction with the cylinder roof, these squish surfaces provide a compression of the air mixture between them and a radially inward-directed airflow during the final phase of the compression stroke. The essential feature is, however, that the measurement tip should be located substantially centrally in the combustion chamber.

Figure 2:
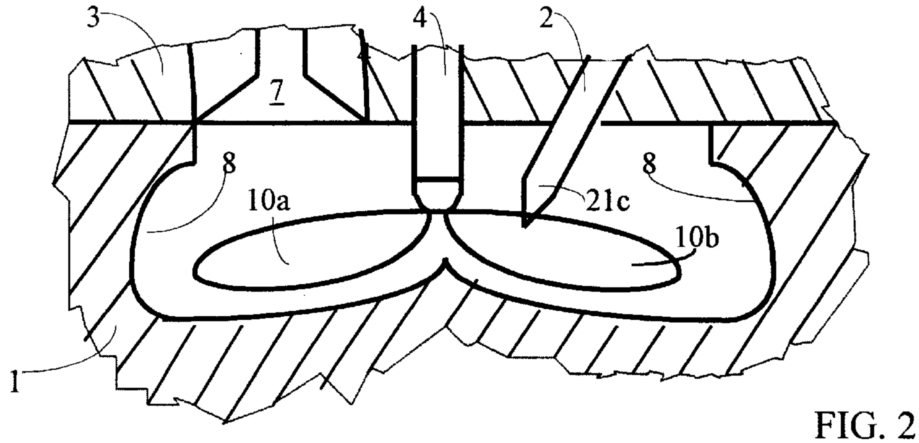
FIG. 2 shows schematically how the measurement arrangement according to the invention is arranged in the combustion chamber relative to the fuel plume that is injected by the injector.
Figure 3:
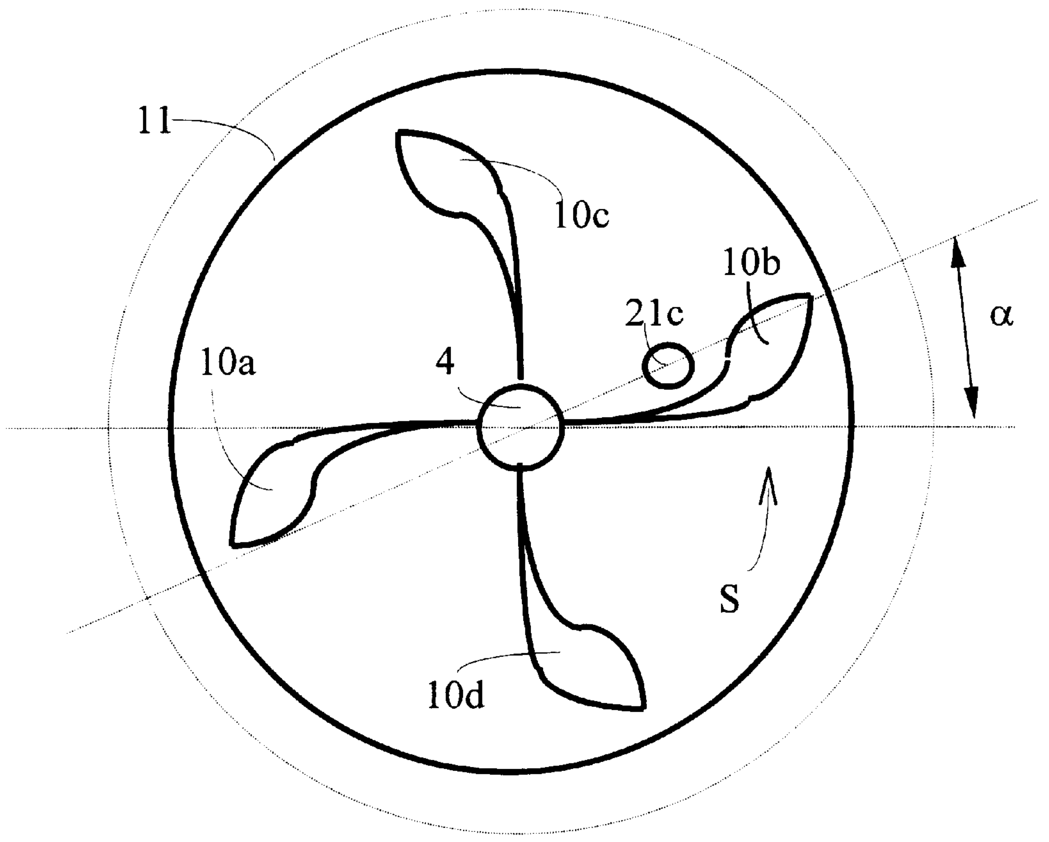
FIG. 3 is a schematic view from above of how the measurement arrangement according to the invention is arranged in the combustion chamber relative to the fuel plume that is injected by the injector.

FIG. 2 shows an enlarged view of how the measurement tip 21*c* is arranged relative to the fuel plumes 10*a,* 10*b* that are formed by the injector 4. The measurement tip should extend into the combustion chamber sufficiently that it reaches down to at least the horizontal plane that is tangent to the upper surface region of the fuel plumes. In FIG. 2, the measurement tip reaches down somewhat farther than this imaginary horizontal plane, since the tip instead is tangent to the rear edge of the fuel plume 10*b*, which is deflected by the air rotation S (FIG. 3). FIG. 3 illustrates fuel injection from an injector 4 that has four outlets, although five to eight outlets are also commonly found. As is conventional, the outlets are evenly distributed about the circumference of the injector in order to distribute the fuel evenly in the annual recess 8 arranged in the piston 1.

In FIG. 3, an angle $\alpha$ is indicated between the center of the measurement tip 21*c* and the outlet direction from the hole on the injector that is arranged nearest the measurement tip. This deflection angle $\alpha$ is dependent on the actual air rotation, that is, the swirl, and is preferably adjusted to a normal load for the motor. During a test on a commercially available, overloaded diesel motor with four cylinders totaling 1.9 liters of cylinder volume, as well as with rotation of the inlet air, it has been found that an angle of deflection a of 20 degrees provides optimal detection and gives a clear signal amplitude over the entire load range of the motor. Any given offset angle $\alpha$ must be adjusted to the current motor and rotation factor (that is, swirl ratio) that is achieved for the air mass, and will always be a trade-off between good detectibility at low rpm ranges and at high rpm ranges.

By comparison with the conventional placement of a glow plug in a diesel motor, the glow plug is preferably located so that the fuel plume contacts the glow plug. A corresponding placement of a measurement tip for ionization detection, however, leads to the measurement tip being sprayed with fuel, which causes a reduction of the amplitude of the ionization signal. If the measurement tip is exposed directly to the fuel, then it is cooled, and the ions that are formed at the edge of the fuel plume are prevented from reaching the measurement tip by the fuel that washes across the tip during injection. This causes the measurement signal to have a reduced level, which provides a lower signal-to-noise ratio.

Measurement Device

Figure 4:
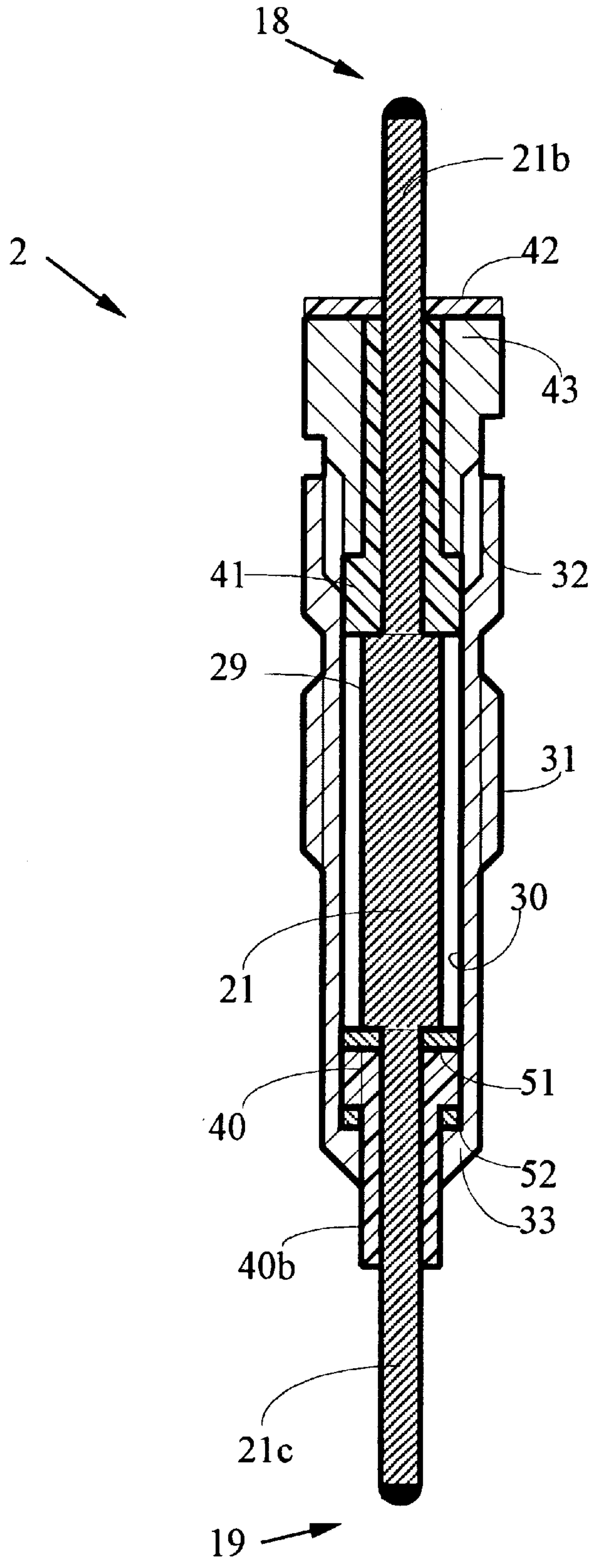
FIG. 4 shows a measurement device according to the invention for detecting ionization in a diesel motor.

FIG. 4 show the measurement device (the probe 2) according to the invention, which allows the measurement tip 21*c* to be located centrally in the combustion chamber in the manner shown in FIGS. 1–3. The measurement device can be manufactured using few component parts and ensures not only that internal short circuits are avoided, but also that heat is efficiently led away. With its central placement in the combustion chamber, the measurement tip 21*c* is subjected to high combustion temperatures and can reach a temperature of up to 1200° C. Any carbon deposits that form on the measurement tip must therefore be prevented from creating short circuits due to conductive bridges, and it should be possible to burn the deposits away. The illustrated measurement device, with a measurement tip 21*c* preferably made of structural steel, has in tests in a diesel motor exhibited bluing, which demonstrates the high thermal stresses. These thermal stresses are, however, not wholly disadvantageous, since they effectively help to burn away the carbon deposits that are formed between the isolated measurement tip 21*c* and the surrounding portions of the cylinder head.

The measurement device includes an electrically conductive rod-shaped member 21 formed as a single piece. A first, inner end 19 of the member 21 forms the measurement tip 21*c*; this inner end of the member 21 has a first diameter and is intended to extend into the combustion chamber as illustrated in FIGS. 1 and 2. The second, outer end 18 of the member 21 has a second diameter and forms a connection portion 21*b* for an electrical contact. The electrically conductive member has a central portion 29 with a third diameter that exceeds both the first and second diameters of the measurement tip 21*c* and of the connection 21*b*, respectively. The rod-shaped member 21 is suitably manufactured of steel, preferably of any known, simple type of stainless steel.

The measurement device further contains a cylindrical, tube-shaped housing 31 with a bore that extends in the longitudinal direction; the rod-shaped, electrically conductive member 21 is arranged within the bore. The bore in the housing 31 has an inner diameter that exceeds the diameter of the central portion 29 of the rod-shaped member 21 from the one end portion of the housing to a radially inward directed shoulder 52 on the other end portion of the housing. When mounted, the rod-shaped member 21 is arranged within the housing with a spacing channel 30 between the housing and the rod-shaped member 21. The isolating channel thus formed can preferably be filled with an insulating material such as silicon grease or silicone, which has good heat-conductive properties and also insulates against electrical short-circuiting. Filling the channel with silicon grease also prevents moisture from getting into the insulating channel and causing electrical shunting.

Since the electrically conductive member 21 of the measurement device is formed from a single piece, and is also provided with a thicker central portion 29, heat is effectively led away from the measurement tip 21*c* and up to the thicker central portion. The thicker central portion thus acts as a cooling body, where the very high instantaneous temperatures that the measurement tip 21*c* is subjected to have time to be cooled down by the housing of the measurement device as well as the surrounding cylinder head 3, via the silicon grease that fills the insulating channel 30.

The rod-shaped member 21 is clamped securely in the housing 31 with the help of a cap piece 43 that cooperates with the housing between two insulating bushings 40, 41. The cap piece is preferably provided with threading 32 that mates with corresponding threading in the housing, so that the measurement device can be mounted using a suitable torque in order to provide the necessary sealing against leakage of combustion gases. In the illustrated embodiment, tightening down the housing takes place against the effect of deformable spacer washers 51, 52, which are arranged on either side of a flange on the lower bushing 40. The spacer washer 52 may, for example, be manufactured of a soft aluminum alloy. Other sealing arrangements may also be employed.

In order to provide good protection against electrical shunting between the measurement tip 21*c* and surrounding portions of the cylinder roof, the lower insulating bushing 40 should preferably be provided with a downward-extending collar 40*b* that extends out from the lower portion 33 of the housing and out onto the measurement tip 21*c*. In this way, a longer insulating bridge is formed between the measurement housing 21*c* and the lower portion 33 of the housing.

The lower insulating bushing 40 is preferably manufactured of a polymer or ceramic material that resists high temperatures. The carbon deposits that may be deposited on the outer surface of the collar 40*b* may cause the measurement tip to be short-circuited onto the cylinder roof. The high temperatures that the measurement tip is subjected to, however, contribute at least partially to burning away of the carbon deposits.

The electrical connection portion 21*b* is preferably shaped so that it is compatible with a standard contact, preferably for connection with a simple cylindrical female contact. An insulating washer 42 may be arranged around the connection 21*b* so that the washer rests against the end portion of the cap piece 43 and the upper end portion of the upper insulating bushing 41. Alternatively, the washer 42 may be omitted or integrated into the end portion of the female contact.

The measurement voltage that is applied to the tip of the measurement device is on the order of 5–20 volts, and preferably around 10 volts. Even if the voltage is relatively low, it is necessary to prevent short circuiting due to shunting potentially caused by the currents that are formed during ionization in the combustion chamber.

The measurement device according to the invention can be manufactured using few component parts. In the illustrated embodiment, with a threaded cap piece 43, the component parts are also easily exchanged if this becomes necessary. In mass-produced versions, the cap piece 43 may instead be replaced by a flanging operation on an extended part of the housing 31, which will lock the component parts using a radially inwardly directed collar on the outer end of the housing.

Calibration Device

Figure 5:
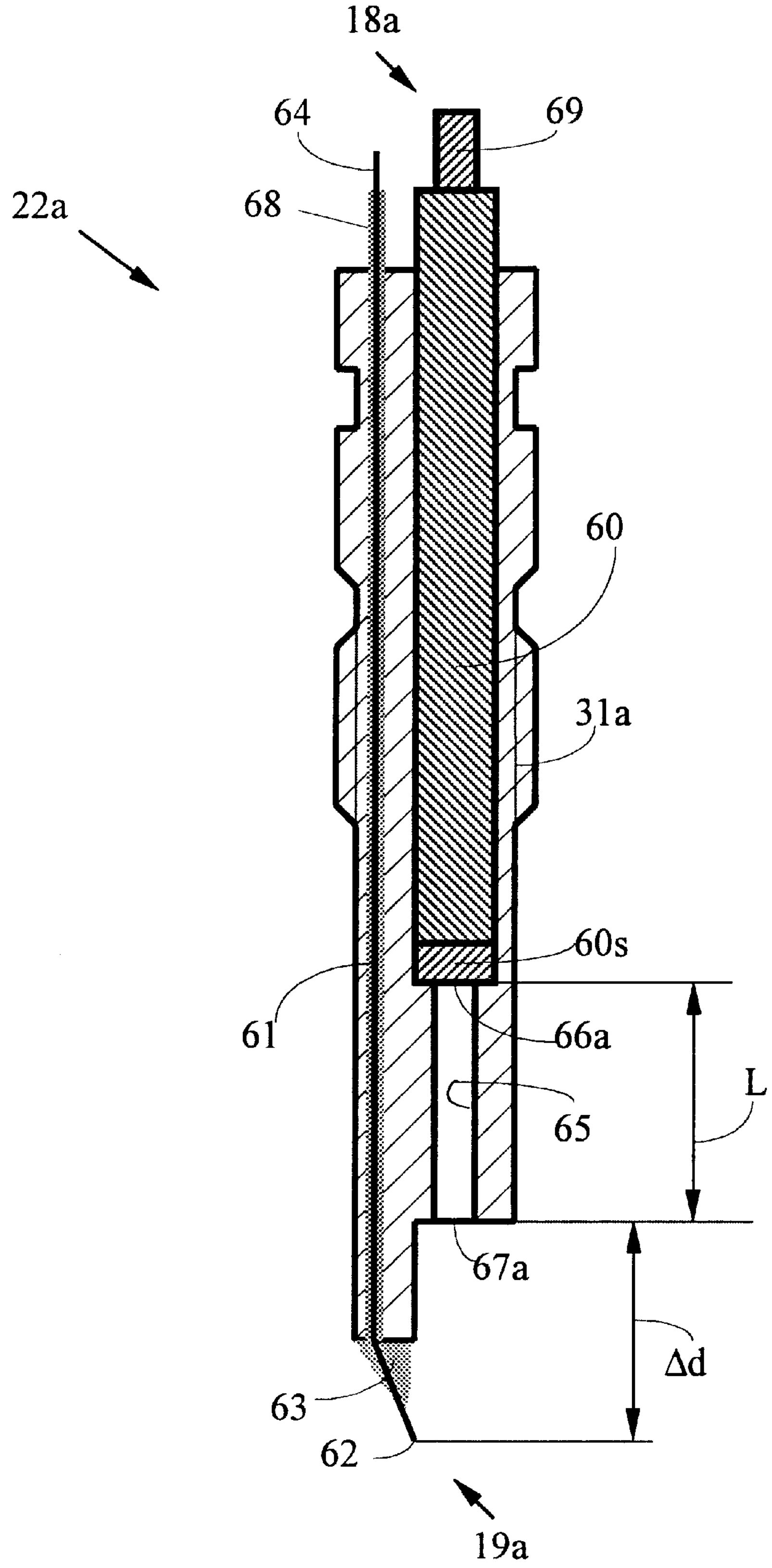
FIG. 5 shows a first embodiment of a calibration device according to the invention.

FIG. 5 shows a first embodiment of a calibration device 22*a*, by means of which one can easily correlate the ion stream signal to the pressure and use this correlation for calibrating the motor. The calibration device 22*a* is compatible with the measurement device 2 shown in FIG. 4 and can be mounted in the same hole in the cylinder head 3 in which the measurement device 2 is mounted when in operation.

The calibration device comprises a longitudinally extending housing 31*a* with a first, inner end 19*a* and a second, outer end 18*a*. Arranged eccentrically in the housing is an electrically conductive member 61. A sheath 63 surrounds the conductor 61 to insulate it from the housing 31*a*. The electrically conductive member can suitably be formed as an insulated conductor that is pulled through a bore that extends in the axial direction through the housing. An outer end 64 of the electrically conductive member may be connected to a suitable contact for connection to measurement equipment.

A pressure sensor 60 is also arranged in the housing and is mounted in an axially extending bore, which is offset relative to the center axis of the housing. The pressure sensor is of any known type, with a cylindrical housing having a sensor element 60*s* in one end and an electrical contact portion 69 at the outer end.

At the outer end 18*a*, the bore has a first diameter that essentially corresponds to the outer diameter of the sensor 60. The inner end 19*a* of the bore has a slightly less diameter so that a connecting channel 65 is formed in the housing 31*a*. The inner end 67*a* of the connecting channel opens into the combustion chamber at a distance Ad from the inner end 19*a* of the calibration device. At the upper end 66*a* of the connecting channel 65, the sensor element 60*s* of the pressure sensor is exposed to the combustion gases in the combustion chamber, via the connecting channel 65.

The length of the connecting channel 65 should be minimized in order to enable correct detection of high-frequency pressure pulses in the combustion chamber—longer connecting channels act as a low-pass filter. Low frequencies can than be correctly detected using the pressure sensor, although frequencies within the resonance frequency of the volume of gas within the connecting channel 65 can lead to strong disturbances, which can greatly exceed the amplitude of the measurement signal. High frequencies, above the resonance frequency, are strongly damped, if they can be detected at all. In order to get a rough approximation of the resonance frequency of the gas column in the connecting channel, one can use the following relationship:

$$F_{RESONANCE}=V^*(4^*L),$$

where:

$F_{RESONANCE}$ is the approximate resonance frequency;

V corresponds to the speed of sound; and

L corresponds to length of the connecting channel.

If, for example, the length of the connecting channel is 14 mm and the average speed of sound is assumed to be 360 m/s, then the resonance frequency for this connecting channel will be roughly 6400 Hertz.

Given a diesel motor running at a normal speed of 3000 rpm, a connecting channel that is 14 mm long means that pressure vibrations lasting over 2–3 degrees of rotation of the camshaft will lie within the resonance frequency of the connecting channel. This means in turn that corresponding short-duration pressure swings, for example from pilot injection, might be drowned out by the noise, and the longer the connecting channel is, the longer the pressure swings will have to last if they are to be detected.

In order for the calibration device 22*a* according to the invention to be fully functional as a measurement device for ionization as well as a pressure sensor, the ion stream-detecting measurement tip must extend into the combustion chamber, at the same time that the pressure sensor must be connected to the combustion chamber via the shortest possible connecting channel; the pressure sensor should also have a shielded mounting arrangement with good cooling.

With the calibration device 22*b* installed in the cylinder head, the pressure sensor and the ion-stream measuring tip can be connected via the respective contacts 69, 64 to conventional, external measurement equipment. While the motor is operated over its expected load range, the motor's ionization/pressure profile, that is, the relationship between ionization and pressure over the load range, can be determined and even plotted. Given this information, normal experimental and design techniques can then be used to help improve the control of the motor.

According to the calibration device according to the invention, the inner end 67*a* of the connecting channel 65 is preferably arranged at a distance Δd from the first, inner end 19*a* of the housing, where the electrically conductive member extends all the way out to the first end 19*a* of the housing. In this way, the pressure sensor has a more protected location and also better cooling.

The electrically conductive member 61 has no insulation at least on the portion 62 that is exposed to the combustion gases in the combustion chamber at the first end 19*a* of the housing. As FIG. 5 shows, a thicker insulating portion 63 can be applied at the first end 19*a* of the housing, so that only the outer tip 62 of the electrically conductive member is exposed.

Figure 6A:
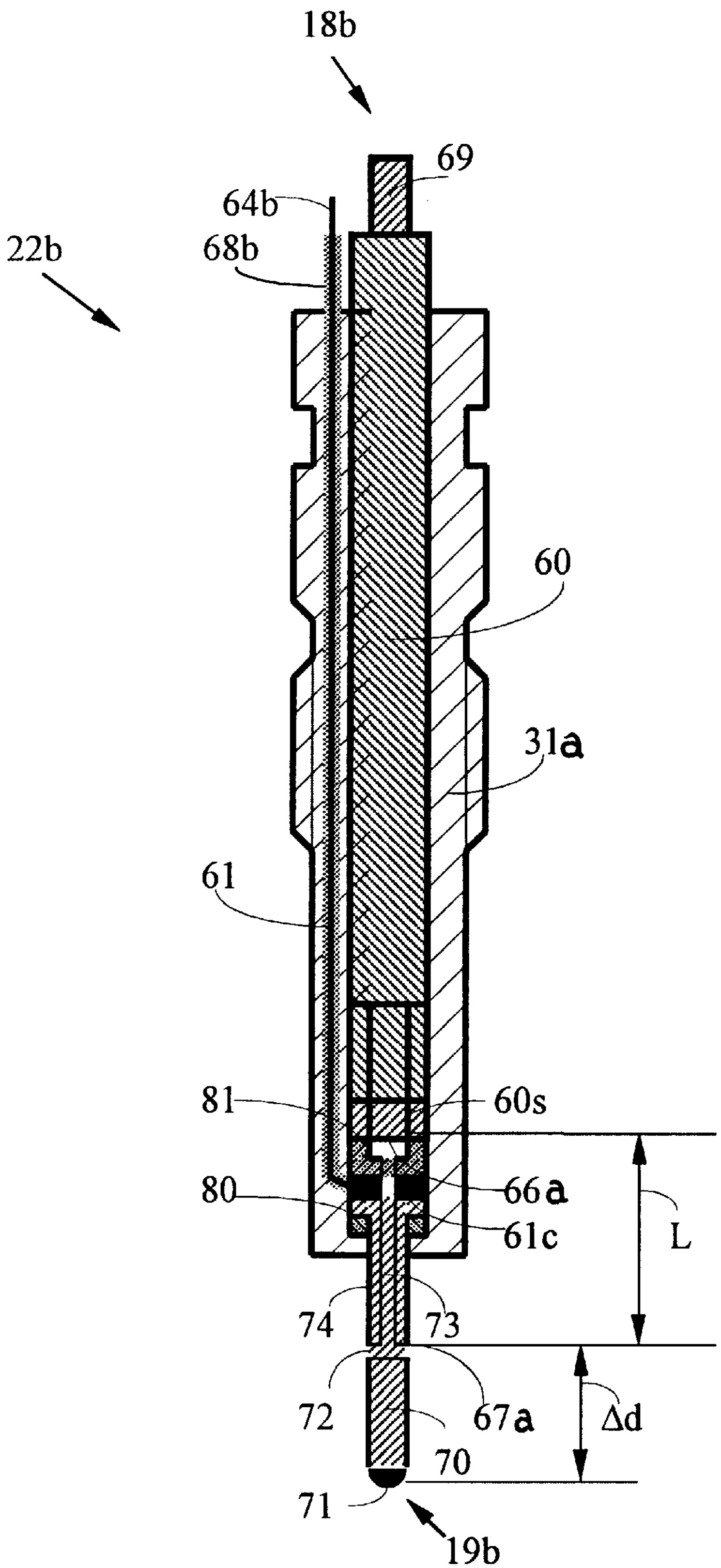
FIG. 6*b* shows a portion of the calibration device of FIG. 6*a***.

FIG. 6*a* shows an alternative embodiment of the calibration device, indicated generally as 22*b*. In this embodiment, the measurement tip, which is exposed to the combustion gases, is shaped as a rod 70 with an integrated connecting channel 73. The measurement tip 70 is an electrically conductive, cylindrical steel rod, with an axially extending bore 73, as well at least one transverse bore 72 connecting the channel 65 to the combustion chamber. An electrically insulating coating 74 is applied to the exterior of the measurement tip, with only the lower portion of the measurement tip 71 being exposed. Voltage can be applied to the measurement tip via a contact washer 61*c*, to which the electrical conductor 61 is connected.

Figure 6B:
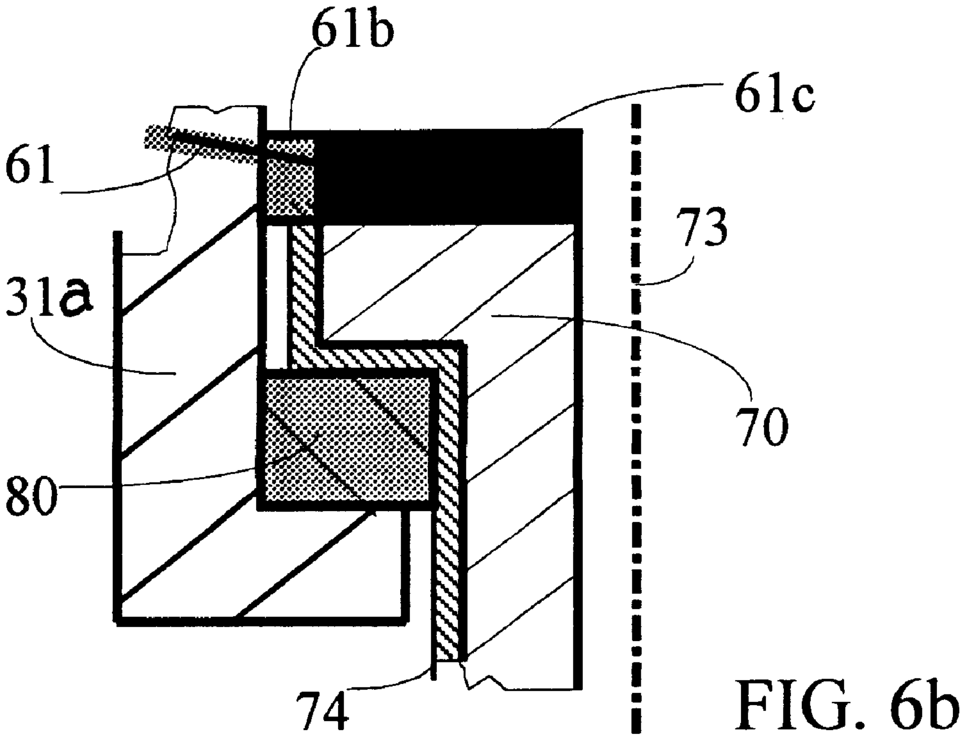

FIG. 6*b* shows in greater detail how contact is made between the contact washer 61*c* and the measurement tip 70 as well as how the measurement tip is insulated from the housing. See also FIG. 6*a*. The measurement tip has an external, insulating coating 74, except on the lowermost portion 71 and on the contact surface of the measurement tip against which the contact washer 61*c* lies. The pressure sensor 60 is preferably threaded securely in the housing so that the lower part 60*s* of the pressure sensor presses the contact washer 61*c* against the measurement tip between an upper, electrically insulating spacer washer 81 and a lower spacer washer 80. The lower spacer washer 80 can be made of an electrically insulating material, but may also be made out of a soft aluminum alloy as long as the coating 74 provides sufficient insulation against electrical bridging, and also in designs in which the coating 74 is not likely to be damaged upon assembly of the calibration device.

The contact washer 61*c* is connected to at least one insulated electrical cable 61, which can be led through a bore in the housing similar to the solution shown in FIG. 5. Alternatively, the electrical cable 61 can be lead in an axially extending groove in the mounting hole in the pressure sensor 60. The electrical cable can have a circular cross section, or may be an insulated foil cable.

The calibration device may be modified in many different ways within the scope of the patent claims. For example, electrical contact with a measurement tip corresponding to the measurement tip 70 in FIG. 6*a* may instead be provided using thin, cylindrical contact sleeves, which are arranged concentrically around the pressure sensor 60, with insulating coatings on both the interior and exterior surfaces of the contact sleeves.

What is claimed is:

1. An arrangement for detecting ionization in a combustion chamber of a combustion motor in which fuel self-ignites by means of compression, comprising:

a piston that moves within a cylinder;

an open-chamber combustion chamber delimited by a cylinder roof, cylinder walls and an upper surface of the piston;

a recess provided in the upper surface of the piston, into which recess the fuel is injected for self-ignition and combustion; and a measurement device having an electrically conductive member that has an outer end forming a connection portion for electrical contact to external measurement equipment and an inner end exposed within the combustion chamber and forming a measurement tip detecting ionization in the combustion chamber, the measurement tip extending into the combustion chamber through the cylinder roof and down into the recess of the piston, the measurement tip terminating substantially centrally within the combustion chamber;

in which the distance between an innermost end of the measurement tip and the cylinder roof, when the piston is in an upper dead-point position within the cylinder, is at least 40% of the distance between the cylinder roof and the piston measured perpendicularly from a plane of the cylinder roof to a center of the recess.

2. An arrangement as defined in claim 1, in which the distance between an innermost end of the measurement tip and the piston, when the piston is in an upper dead-point position within the cylinder, lies in the interval 20–60% of the distance between the cylinder roof and the upper surface of the piston.

3. An arrangement as defined in claim 2, further comprising:

an injector injecting fuel directly into and essentially centrally in the combustion chamber and down into the annular recessed piston, the injector having a plurality of outlets directing fuel plumes substantially radially outward from the injector and substantially perpendicular to the cylinder walls;

in which the measurement tip is arranged in the combustion chamber tangentially to the fuel plumes.

4. An arrangement as defined in claim 1, in which:

the recess is substantially rotationally symmetric about a central axis of the piston;

the recess is substantially annular, with a centrally located protrusion extending upward from an upper surface of the piston;

the measurement tip extends into the combustion chamber and down into the recess of the piston so that the distance between an innermost portion of the tip and the centrally located protrusion, when the piston is in an upper dead-point position, is less than the distance between the innermost portion of the measurement tip and remaining surfaces on the upper surface of the piston.

5. An arrangement as defined in claim 1, further comprising:

a longitudinally extending, cylindrical housing having an inner end and a lengthwise extending bore in which the electrically conductive member is located, and a radially inward extending shoulder on the inner end of the housing;

a cap piece arranged in an outer end of the housing;

a first insulating bushing arranged in the inner end of the housing between the radially inward extending shoulder on the inner end of the housing and the of the electrically conductive member;

a second insulating bushing arranged around the outer end portion of the housing between the cap piece and the central portion of the electrically conductive member; and an insulating slit is located between an inner surface of the housing and the electrically conductive, lengthwise extending member.

6. An arrangement as defined in claim 5, in which:

the first insulating bushing is arranged concentrically around the electrically conductive member;

the first insulating bushing is provided with a collar that extends in the longitudinal direction towards the measurement tip farther than an innermost portion of the housing.

7. An arrangement as defined in claim 5, in which the insulating slit is filled with an electrically insulating material having high thermal conductivity.

8. A calibration device for detecting ionization in a combustion motor in which fuel self-ignites by means of compression, comprising:

a longitudinally extending housing having an inner end portion and an outer end portion;

an electrically conductive member extending lengthwise within the housing and having an outer tip extending within a combustion chamber of the motor;

a sheath extending partially around the electrically conductive member and insulating it from the housing;

a pressure sensor having a connecting channel in the housing, a first end of the connecting channel opening into the combustion chamber and a second end of the connecting channel exposing a sensor element of the pressure sensor to combustion gases in the combustion chamber through the connecting channel;

in which:

the outer tip of the electrically conductive member is uninsulated and thereby exposed to combustion gases within the combustion chamber.

* * * * *